April 6, 1971   J. E. JONES ET AL   3,574,080
CORROSION INHIBITING FASTENER MEANS
Filed Nov. 18, 1966
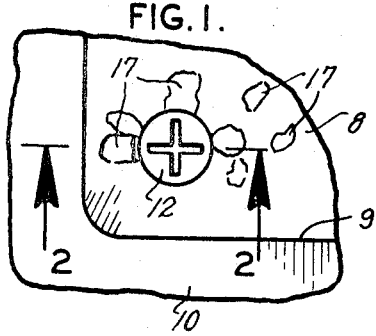
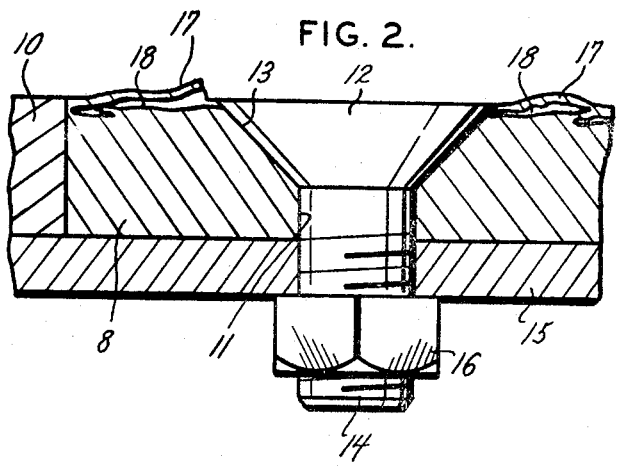
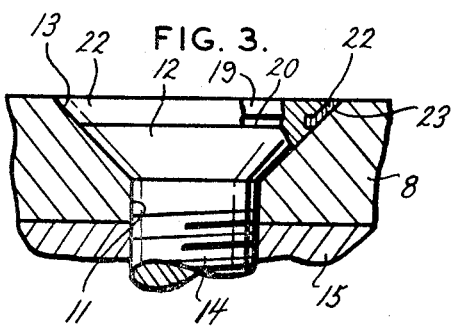
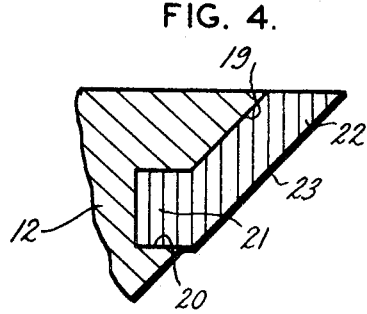
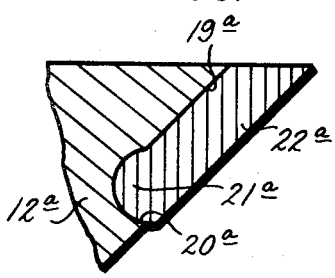
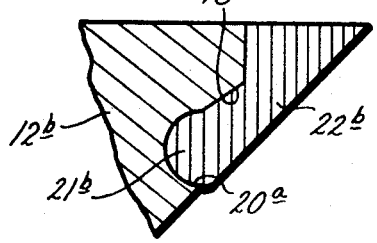
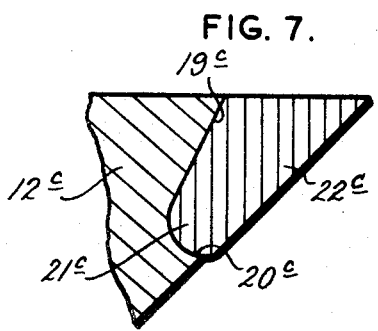
INVENTORS
JOSEPH E. JONES
DAVID S. MACY
BY Gravely, Lieder & Woodruff
ATTORNEYS United States Patent Office 3,574,080
Patented Apr. 6, 1971

3,574,080
CORROSION INHIBITING FASTENER MEANS
Joseph E. Jones, St. Louis, and David S. Macy, Creve
Coeur, Mo., assignors to McDonnell Douglas Corporation, St. Louis, Mo.
Filed Nov. 18, 1966, Ser. No. 595,516
Int. Cl. C23f 13/00
U.S. Cl. 204—197                              6 Claims

ABSTRACT OF THE DISCLOSURE

A fastener for securing two sheets of metal together includes a shank which extends through the sheets and a head positioned at the outermost sheet. The head is provided with a recesss into which a ring is fitted, and the ring bears against the outermost sheet adjacent to the outer surface thereof. The ring is formed from a metal higher in the electromotive series of metals than both the metal of the head or the outermost sheet.

---

This invention relates to corrosion inhibiting fastener means primarily for, but not limited to aircraft structure, and is particularly concerned with inhibiting exfoliation corrosion.

While the present invention has immediate utility and need in connection with high speed aircraft to reduce the high cost of maintenance, it is broadly useful in connection with any application where it is necessary to place fastening means in a field of high electron flow in the skin area of a body. The following disclosure will be presented in connection with aircraft but it is not to be so limited.

Certain present types of high speed aircraft must be equipped with control equipment, radar, and communication apparatus (to mention a few) which use both AC and DC sources of power. It is generally found that the ground connections for this equipment and apparatus is the body or airframe of the aircraft which means that there are many circuits feeding AC and DC currents into the body or airframe. It is understood that most DC currents tend to travel through the mass of a conductor while AC currents tend to travel along the skin surface. It is also understood that there is some galvanic corrosion when dissimilar materials are present in an electrolytic medium (acid, alkali or salt). However, one of the biggest maintenance problems in connection with airframes is exfoliation corrosion which is manifested by the scaling or flaking off in the skin surfaces surrounding fastening means for the various access panels.

In exfoliation corrosion the aircraft is impressed with electrostatic currents on the skin surfaces, since the skin is the exposed portion, in addition to currents from internal sources. The skin surfaces are not continuous and of the same materials due to obvious structural requirements, so that the current playing in the skin surfaces encounters areas or points of resistance. The areas or points of resistance are, for the most part, the surface elements or components securing means which are usually removable, of high strength, and different from the skin or access panel material. When the current encounters the fastening means it encounters the high resistance to current flow. Now, according to Ohm's law a steady current in a circuit is directly proportional to the total E.M.F. acting in the circuit and is inversely proportional to the total resistance of the circuit. Thus, the resistance of the fastening means to the bombardment of electrons causes some electrons to flow into the atmosphere resulting in a loss of electrons from the skin elements in the area of the fastening means. This loss, as it progresses, develops intergranular degradation sufficient to cause exfoliation, hence, the term exfoliation corrosion. As the current increases the rate of exfoliation corrosion increases. The environment in which such aircraft exist and fly is another factor which also contributes to the corrosion problem.

It is, therefore, an important object of this invention to overcome the exfoliation corrosion problem by simple and inexpensive means.

It is also an important object of this invention to provide a fastening means for securing skin panels to bodies movable at high speeds in the earth environments that will be substantially removed from the current path so as not to form areas or points of high resistance which encourages exfoliation corrosion.

Another object of this invention is to provide a fastening which retains its torque values under operational loads and vibrations and provides resistance to exfoliation corrosion.

A still further object of this invention is to provide a fastening with an electrolyte restrictor to provide resistance to the exfoliation corrosion problem.

A still further object of this invention is to provide a fastening with an anodic or sacrificial component with respect to adjacent materials as a means to overcome exfoliation corrosion.

Other objects and attendant advantages of this invention reside in the components and parts, and in the combination of parts, all as are set forth in the following specification when taken with the accompanying drawings, wherein:

FIG. 1 is a fragmentary plan view of the skin of an airframe structure and an access panel showing the head of a securing means of this invention, the view also depicting the exfoliation corrosion effect;

FIG. 2 is sectional elevational view taken at line 2—2 in FIG. 1;

FIG. 3 is a partial sectional view similar to FIG. 2 but showing a fastener incorporating the invention described herein;

FIG. 4 is a greatly enlarged partially sectioned view of a fastener means of this invention; and FIGS. 5, 6 and 7 are views similar to FIG. 4, but showing certain modifications in the form of fastener means of this invention.

In FIGS. 1 and 2 the panel 8 set in the opening 9 of an airframe 10 is suitably apertured at 11 to receive the countersunk head 12 of the fastener. In this disclosure the panel 8 has a drilled aperture 11 and the outer end has the countersunk recess 13 for the fastener head 12. The shank 14 of the fastener extends through a second member 15 to engage a nut 16. Thus the panel 8 and member 15 are clamped together between the head 12 and nut 16. The exfoliation corrosion occurring in the skin of the panel 8 is depicted at 17 and 18 as scaling in the panel. If allowed to continue for any length of time, the material of panel 8 will flake off in layers as if it had been originally a laminated panel. The flaking is a direct result of the skin deep corrosion effect. It is initially manifested by the formation of small protrusions 17 in FIG. 1 and by shallow subsurface corrosion veins or fissures 18.

In FIG. 3 and FIG. 4 the fastener head 12 is formed with an annular recess 19 adjacent its outer end, and the recess has a surface portion 20 which projects radially beyond the portion 19 as measured along the slope of the head 12 above the shank 14. A ring element 22 is positioned adjacent the recess 19 and is suitably pressed into position so that it fills the recess 19 and is mechanically held by the portion 21 engaging the surface 20 so that the ring element is prevented from falling off. The ring element 22 after being pressed into position has some rebound effect which causes its outer bearing surface 23 to project slightly beyond the sloping lateral surface of the head 12 providing a restriction to electrolyte entry.

The material of the fastener is such that the head 12 and shank 14 have great strength for the purpose of resisting the loads and forces on the panel 8. It is also different from the material of the panel 8, and the ring element is still a different material, as will be set forth.

Most importantly the ring element 22 is of a metallic material that is anodic to both the fastener and the panel material surrounding the fastener. It is not intermediate in the E.M.F. series, but has a higher electrical potential and is outside the E.M.F. range bounded by the fastener and the panel. If the environment is such that a balance potential is not achieved between the fastener head 12 and the panel 8, the ring element will be the sacrificial material because it is anodic relative to the fastener and the panel.

Another important feature of the fastener is that the ring element 22 is positioned close to the outer end of the head 12 so that there is adequate structural material to carry the loads provided below the panel skin thickness where the corrosion does not often occur.

In FIGS. 5 to 7 inclusive, the fastener heads have been modified to accept ring elements of various shapes. In FIG. 5 the fastener head 12a has an annular recess 19a in which the surface 20a acts to retain the portion 21a of the ring element 22a. In FIG. 6 the recess 19b in head 12b is altered to allow for an increase in the mass of the ring 22b, but the ring is retained in position by the portion 21b engaging the surface 20b. In FIG. 7, the recess 19c in head 12c is altered to accept a tapered ring 22c, but the ring is still retained by the portion 21c engaging with the recess surface 20c.

In general, the anodic ring element 22 can be adapted to fit fastener heads that are round, hexagonal, or multi-point. The recess can be any convenient shape as long as it has the retention portion 21 shaped to retain the ring with normal handling abuse and reuse. It is preferred to avoid bonding or cementing the ring in position because of cost and bonding or cementing is not essential nor beneficial to its function.

In the components of FIGS. 1 and 2, the panel 8 may be subjected to moisture that could be acid, alkaline or salt, and wtih dissimilar materials (metallic) for the panel 8 and the fastener head 12 a battery effect is produced (galvanic) in which electrical current is generated at the expense of the material going into solution. This "going into solution" is the (oxydation) corrosion produced in the reaction, and it generally is the material of the panel 8. In the galvanic action the material that goes into solution is electro-positive to the other material and is converted into a chemical compound (corrosion) while generating current at the other material which becomes the cathode.

Considered in another phase, the ring element 22 was said to be anodic relative to the panel 8 and fastener head 12. This means that the current flows into the ring element and when the atmospheric conditions are suitable to produce a battery effect, or to impress a voltage on the panel and fastener, the ring 22 is the component in the assembly that goes into solution.

In practice, the atmospheric conditions adjacent the panel 8 and fastener 12 are such that a current flow is generated between the panel and fastener. In most cases the panel material has the freer electrons and its metallurgical integrity is sacrificed in the area adjacent the fastener. As more contaminates or electrolytes gather around the fastener heads, the faster is the rate of corrosion, and when atmospheric current flow is added to the current flowing in the body of the airframe 10 the corrosion rate is increased. Eddy currents from AC and pulsating DC power components further increase the corrosion rate.

As an example of the materials which have been utilized to carry into practice the invention of this specification, in one installation the panel 8 was formed of (hi-strength) 7178 aluminum alloy, the screws were made of H-11 series or 4130 alloy steel, and the sacrificial rings 22 were made of 1100 F aluminum. No limitations are to be implied from the foregoing, as the materials are stated in order to illustrate the physical, electrical and metallurgical characteristics and relationships of the components.

This invention is intended to cover all changes and modifications of the examples of the invention herein chosen for purposes of the disclosure, which do not constitute departures from the spirit and scope of the appended claims.

What is claimed is:

1. In combination with at least two members, the outermost of which is metallic and has an outer surface exposed to ambient conditions; a fastener for securing the members to one another, said fastener comprising a metallic shank extending from one of the members to the other member, a metallic head formed integral with the shank and having a lateral surface located outwardly from the shank and positioned such that it faces a portion of the outermost member, the head having a recess extending inwardly from the lateral surface and located adjacent to the outer surface of the outermost member and in spaced relation to the junction of the head and the shank whereby the structural integrity of the fastener is not impaired at that juncture, an insert located in the recess and having a bearing surface positioned against the outermost member and being substantially continuous with the lateral surface of the head, the insert being formed from a metallic material higher in the electromotive series of metals than either the metal of the shank and head or the metal of the outermost member, and means engageable with the shank for exerting a tensile force on the shank and a resultant compresisve force on the members.

2. The combination set forth in claim 1 wherein the recess is annular and the insert is a ring set into the recess.

3. The combination set forth in claim 2 wherein said recess extends about said head and provides a surface extending generally radially outwardly of said recess, and said ring mounted in said recess has a portion engaged with said extending surface to retain the said ring therein, said ring providing an exterior surface projecting generally radially outwardly relative to said head to restrict the flow of an electrolyte passed said head to substantially obviate corrosion in the outer member.

4. The combination set forth in claim 2 wherein the bearing surface of the ring when unrestrained projects slightly beyond the lateral face of the head, whereby the bearing surface will seat tightly against the outermost member as the lateral surface is drawn toward the outermost member.

5. The combination according to claim 4 wherein the bearing surface of the ring and the lateral surface of the head are generally frusto-conical in shape.

6. The combination set forth in claim 1 wherein the means for exerting a tensile force on the shank includes threads on the shank.

References Cited

UNITED STATES PATENTS

| | | | |
|---|---|---|---|
| 2,404,031 | 7/1946 | Bunn et al. | 204—197 |
| 2,663,270 | 12/1953 | Friedly | 85—37 |
| 3,060,112 | 10/1962 | Shomber | 204—197 |
| 3,159,073 | 12/1964 | Dickie | 85—9 |
| 3,159,559 | 12/1964 | Eberhardt | 204—197 |

JOHN H. MACK, Primary Examiner

T. TUNG, Assistant Examiner

U.S. Cl. X.R.

204—148; 85—9, 37; 244—125, 126